US011549648B2

(12) United States Patent
Adler et al.

(10) Patent No.: US 11,549,648 B2
(45) Date of Patent: Jan. 10, 2023

(54) SAFETY VALVE FOR A PRESSURE VESSEL HAVING A RELEASE LINE, AND PRESSURE VESSEL SYSTEM

(71) Applicant: Bayerische Motoren Werke Aktiengesellschaft, Munich (DE)

(72) Inventors: Tim Adler, Munich (DE); Simon Hettenkofer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 285 days.

(21) Appl. No.: 16/760,493

(22) PCT Filed: Sep. 14, 2018

(86) PCT No.: PCT/EP2018/074847
§ 371 (c)(1),
(2) Date: Apr. 30, 2020

(87) PCT Pub. No.: WO2019/101385
PCT Pub. Date: May 31, 2019

(65) Prior Publication Data
US 2020/0256518 A1    Aug. 13, 2020

(30) Foreign Application Priority Data

Nov. 24, 2017   (DE) ..................... 10 2017 221 073.7

(51) Int. Cl.
*F17C 13/12*   (2006.01)

(52) U.S. Cl.
CPC ...... *F17C 13/12* (2013.01); *F17C 2203/0614* (2013.01); *F17C 2205/0314* (2013.01);
(Continued)

(58) Field of Classification Search
CPC ............. F17C 13/12; F17C 2205/0314; F17C 2205/0332; F17C 2221/012;
(Continued)

(56) References Cited

U.S. PATENT DOCUMENTS 3,323,531 A * 6/1967 Spellman ................ F41A 33/04
102/314
3,512,556 A * 5/1970 McKhann ............... F16K 17/38
137/71

(Continued)

FOREIGN PATENT DOCUMENTS

CN    202001825 U    10/2011
CN    107110345 A    8/2017
(Continued)

OTHER PUBLICATIONS

International Search Report (PCT/ISA/210) issued in PCT Application No. PCT/EP2018/074847 dated Nov. 16, 2018 with English translation (seven pages).

(Continued)

*Primary Examiner* — Minh Q Le
(74) *Attorney, Agent, or Firm* — Crowell & Moring LLP

(57) ABSTRACT

A thermally activatable safety valve for a pressure vessel includes i) a pressure relief unit having a valve for pressure relief of the pressure vessel; ii) at least one release line which extends away from the pressure relief unit; and iii) at least one bursting device. The release line, the bursting device and the valve are fluidically connected and form a common fluid system. The valve is designed, for pressure relief, to pass from a first closed position into a second open position if the pressure in the fluid system is less than an actuating limit pressure. The bursting device is designed to bring about pressure relief in the fluid system if the pressure in the fluid system exceeds a release pressure.

17 Claims, 4 Drawing Sheets

(52) U.S. Cl.
CPC ............ *F17C 2205/0332* (2013.01); *F17C 2221/012* (2013.01); *F17C 2223/0123* (2013.01); *F17C 2260/042* (2013.01); *F17C 2270/0178* (2013.01)

(58) Field of Classification Search
CPC ........ F17C 2223/0123; F17C 2260/042; F17C 2270/0178; Y02E 60/32
USPC ................ 220/89.1; 137/68.19, 72, 68.11
See application file for complete search history.

(56) References Cited

U.S. PATENT DOCUMENTS

| | | | | |
|---|---|---|---|---|
| 3,851,321 | A * | 11/1974 | Stitt | G08B 17/04 137/557 |
| 3,961,328 | A * | 6/1976 | Hornbostel, Jr. | G08B 13/20 340/592 |
| 4,438,792 | A * | 3/1984 | Timberlake, Jr. | B65D 90/32 220/DIG. 16 |
| 5,029,622 | A * | 7/1991 | Mutter | F17C 13/02 141/94 |
| 5,042,520 | A * | 8/1991 | Reznik | F17C 13/123 137/72 |
| 5,511,576 | A * | 4/1996 | Borland | F16K 17/383 137/72 |
| 5,788,212 | A * | 8/1998 | Hackman | F16K 17/38 251/66 |
| 5,820,162 | A * | 10/1998 | Fink | B60R 21/26 137/71 |
| 5,848,604 | A * | 12/1998 | Eihusen | F16K 17/383 137/72 |
| 6,240,951 | B1 * | 6/2001 | Yori | F16K 15/207 137/224 |
| 6,269,830 | B1 * | 8/2001 | Ingle | G05D 23/026 137/79 |
| 6,382,232 | B1 * | 5/2002 | Portmann | F16K 13/06 102/275.1 |
| 6,446,616 | B1 * | 9/2002 | Kabat | F02M 37/20 123/527 |
| 6,898,985 | B1 * | 5/2005 | Gautreau | F17C 13/02 62/45.1 |
| 7,721,750 | B2 * | 5/2010 | Lindner | F28D 15/02 137/72 |
| 8,141,574 | B2 * | 3/2012 | Weatherly | F16K 17/383 137/72 |
| 8,550,105 | B2 * | 10/2013 | Ishitoya | F16K 17/383 137/72 |
| 8,636,165 | B2 * | 1/2014 | Handa | B60K 15/03006 137/79 |
| 9,016,301 | B2 * | 4/2015 | Tichborne | F16L 55/1022 137/71 |
| 9,097,358 | B2 * | 8/2015 | Girouard | F16K 31/002 |
| 2007/0074759 | A1 * | 4/2007 | McClung | F16K 37/0066 137/68.14 |
| 2009/0078706 | A1 * | 3/2009 | Ishitoya | F17C 13/04 220/562 |
| 2011/0056571 | A1 * | 3/2011 | Bayliff | F17C 7/00 137/511 |
| 2011/0127263 | A1 * | 6/2011 | Lee | F17C 13/12 220/89.2 |
| 2011/0180551 | A1 | 7/2011 | Handa | |
| 2015/0027559 | A1 * | 1/2015 | Retz | F17C 13/12 137/68.19 |
| 2016/0033085 | A1 * | 2/2016 | Sirosh | F17C 13/12 137/2 |
| 2017/0082245 | A1 | 3/2017 | Schwartz | |
| 2017/0335984 | A1 * | 11/2017 | Carter | F16K 17/406 |
| 2017/0343104 | A1 | 11/2017 | Martin et al. | |
| 2018/0259124 | A1 * | 9/2018 | Kondo | F17C 13/04 |
| 2018/0266577 | A1 * | 9/2018 | Garg | F17C 1/14 |
| 2018/0328540 | A1 * | 11/2018 | Hettenkofer | F17C 13/04 |
| 2020/0149683 | A1 * | 5/2020 | Kreutzer | F15B 1/08 |
| 2020/0256518 | A1 * | 8/2020 | Adler | F17C 13/12 |
| 2021/0172540 | A1 * | 6/2021 | Morgan | F16K 37/0025 |

FOREIGN PATENT DOCUMENTS

| | | |
|---|---|---|
| DE | 20 2004 021 365 U1 | 1/2008 |
| DE | 10 2011 114 722 A1 | 4/2013 |
| DE | 10 2011 114 725 A1 | 4/2013 |
| DE | 10 2014 213 585 A1 | 1/2016 |
| DE | 10 2015 218 231 A1 | 3/2017 |
| DE | 10 2015 222 252 A1 | 5/2017 |
| EP | 1 655 533 A1 | 5/2006 |
| WO | WO 2013/045030 A1 | 4/2013 |

OTHER PUBLICATIONS

German-language Written Opinion (PCT/ISA/237) issued in PCT Application No. PCT/EP2018/074847 dated Nov. 16, 2018 (eight pages).

German-language Search Report issued in German Application No. 10 2017 221 073.7 dated Jul. 12, 2018 with partial English translation (12 pages).

Chinese-language Office Action issued in Chinese Application No. 201880070300.3 dated Apr. 13, 2021 with English translation (14 pages).

* cited by examiner

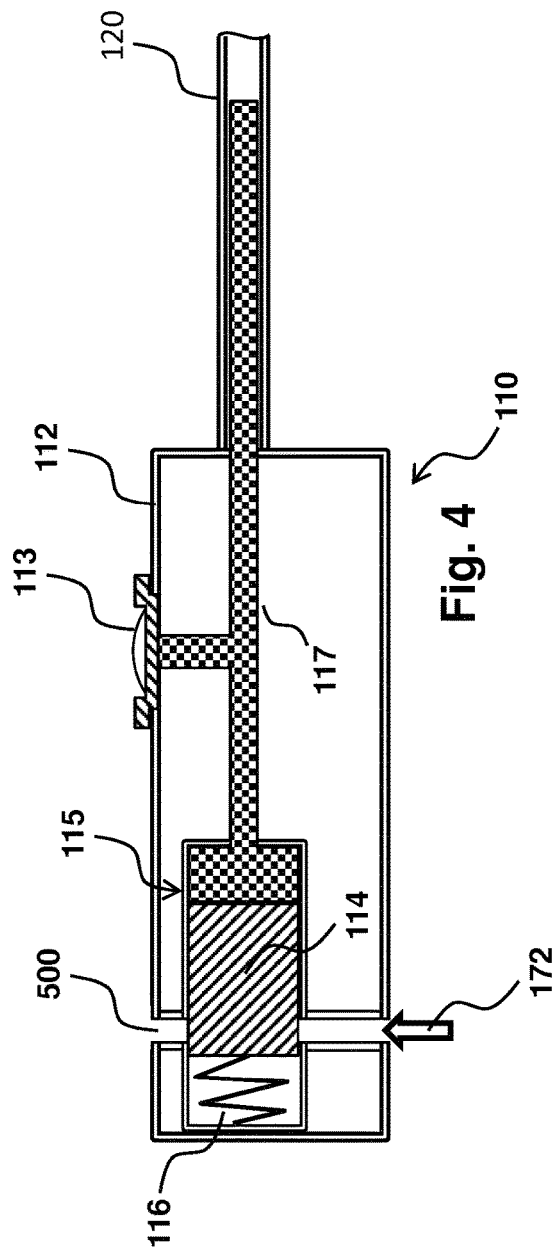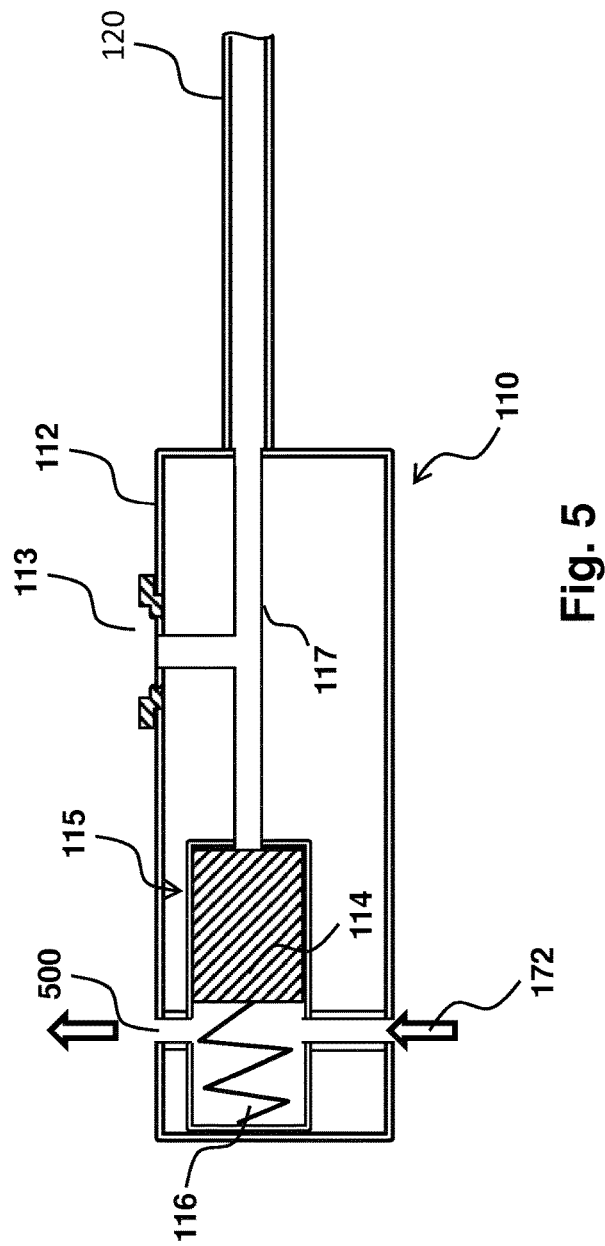

_US 11,549,648 B2_

SAFETY VALVE FOR A PRESSURE VESSEL HAVING A RELEASE LINE, AND PRESSURE VESSEL SYSTEM

BACKGROUND AND SUMMARY OF THE INVENTION

The technology disclosed here relates to a safety valve for a pressure vessel having a release line, and to a pressure vessel having such a safety valve. Furthermore, the technology disclosed here relates to a method for pressure relief of the pressure vessel system and to a method for putting the thermally activatable safety valve into operation. In particular, the technology relates to a pressure vessel for storing fuel in a motor vehicle.

Such a safety valve and such a pressure vessel are known, for example, from the German patent application having the publication number DE 10 2015 222252 A1.

It is a preferred object of the technology disclosed here to reduce or eliminate at least one disadvantage of a previously known solution or to propose an alternative solution. It is in particular a preferred object of the technology disclosed here to improve the installation and/or the exchange of components of the safety valve, in particular the bursting device and/or the release line. Further preferred objects may arise from the advantageous effects of the technology disclosed here. The object(s) is/are achieved by means of the subject matter of the independent patent claims. The dependent claims constitute preferred refinements.

The object is achieved in particular by a safety valve for a pressure vessel having a release line which extends away from a pressure relief unit, in particular away from the housing of the pressure relief unit, and by a pressure vessel system having at least one pressure vessel and having a safety valve disclosed here.

The safety valve is in particular a thermal or thermally activatable pressure relief valve, also called thermal pressure release device (TPRD) or thermal fuse. If a malfunction occurs due to an external thermal action, the safety valve is designed to reduce the pressure in the pressure vessel system, in particular in the at least one pressure vessel. The safety valve discharges the fuel as soon as the release temperature of the safety valve is exceeded (is thermally activated).

Pressure Relief Unit

The safety valve comprises at least one pressure relief unit. In the mounted state, the pressure relief unit is directly or indirectly fluidically connected to the at least one pressure vessel. The pressure relief unit can be expediently designed to permit, for the pressure relief of the pressure vessel, a fuel extraction mass flow which is greater (for example at least by the factor of 1.5, 2, 5, 10, 100 or higher) than the maximum fuel extraction mass flow through the extraction path to the at least one energy converter (as a rule a fuel cell), wherein the extraction via the extraction path is, as a rule, changeable by means of a tank shut-off valve. The pressure relief unit is, as a rule, not used for filling the pressure vessel system and/or for the extraction of fuel for providing energy in the motor vehicle during operation without incident. For the pressure relief, as a rule use is made of a flow path parallel to the anode subsystem of a fuel cell system. As a rule, the pressure vessel internal pressure is lowered to atmospheric pressure by the pressure relief. In the event of action of heat (for example by means of flames), the fuel stored in the pressure vessel is discharged into the surroundings by the safety valve.

The pressure relief unit is furthermore connected fluidically to the at least one release line disclosed here and to the at least one bursting device disclosed here. The release line, the bursting device and the valve form a joint and closed fluid system here.

The pressure relief unit can comprise a separate housing which is preferably fastenable or fastened to a connection piece. The connection piece is provided in a pressure vessel opening of the pressure vessel. As a rule, the connection piece is screwed into the pressure vessel opening provided at one end of the pressure vessel, in particular into a boss produced from metal. Such a connection piece as a rule also comprises a tank shut-off valve and is frequently referred to as an on-tank valve. The pressure relief unit can likewise also be formed integrally with the connection piece in a common housing.

Valve

The pressure relief unit comprises a valve for pressure relief of the pressure vessel. The valve is designed to pass from a first closed position into a second open position, for pressure relief, if the pressure in the fluid system disclosed here is lower than an actuating limit pressure of the valve.

The valve is in particular a pressure-actuated valve. The valve is expediently actuated by changing a control pressure, in particular by changing the pressure within the fluid system disclosed here.

The valve is expediently a valve opened without pressure. If, therefore, ambient pressure prevails in the fluid system, the valve is in the open position. The actuating limit pressure is the control pressure at which the valve is actuated.

The second open position of the valve is the position in which the fuel from the pressure vessel interior can escape through the fuel path from the valve for pressure relief, as a rule into the vehicle surroundings or into a fuel collecting device external to the vehicle. In other words, the valve is thus open, and therefore an open fluidic connection to the surroundings is provided.

Meanwhile, the closed first position of the valve is the position in which the valve interrupts the fluidic connection to the vehicle surroundings or to the fuel collecting device. Consequently, fuel therefore cannot escape through the fuel path from the valve for pressure relief.

Release Line

The release line can be a line, in particular a pipe, which preferably extends at least in regions over the surface of the pressure vessel. The release line preferably extends at least partially over a central region or casing region of the pressure vessel. The central region is as a rule of cylindrical design and/or is arranged between the ends of the pressure vessel. The release line preferably runs at least in regions in the axial direction and/or in the circumferential direction of the pressure vessel. The release line particularly preferably runs helically or spirally or in meandering form over the surface of the pressure vessel. Adjacent sections of the release line are preferably spaced apart in such a manner that a thermal event occurring between said adjacent sections is reliably detected and the safety valve reliably discharges the combustion gas before the pressure vessel becomes damaged.

The release line can be designed in particular to be pressure-resistant, in particular in such a manner that the release line does not expand and/or become damaged due to an operationally induced increase in pressure and/or is closed due to a mechanical action which is not operationally induced, wherein expansions which are not relevant to the functioning and mechanical actions are irrelevant. A particularly operationally reliable safety valve can therefore advantageously be realized.

The line is preferably manufactured from a metal. Furthermore preferably, the line can be formed from a material having a melting point far above the limit temperature. A release line which has better thermal conductivity in the radial direction than in the axial direction of the release line is particularly preferred. In an advantageous manner, heat conduction is thus forced into the substance described below whereas a as a rule undesirable dissipation of heat along the release line can be reduced.

Substance S

A substance or material S is arranged at least in regions in the release line. The substance can be, for example, a pure substance or a mixture of substances. In particular, it can be a fluid. The substance S fills at least regions of, and preferably the entire inner volume of the release line disclosed here, the cartridge disclosed here or the fluid system disclosed here. The substance S expediently freezes only at a temperature below minus 60° C. The substance S is preferably propane or a propane-butane mixture. The substance is in particular not the stored combustion gas.

The substance S can be designed to change the substance volume and/or the pressure in the interior volume (or at least in a partial volume of the interior volume) depending on the substance temperature.

Only the situation in which the thermal event increases the temperature of the substance and therefore, in association, also the substance volume or the pressure in the release line, is discussed below. It would as it were also be conceivable for a reduction in volume or decrease in pressure to be realized due to a sealing anomaly or a phase change.

Use is particularly preferably made of a substance, the substance density of which changes to a very great degree and/or abruptly and/or irregularly with the substance temperature within a release temperature window of the safety valve, for example due to an at least partial phase transformation, also called phase transition. The temperature-induced isochoric change in state brings about an increase in pressure. In the release temperature window, said increase in pressure is preferably particularly pronounced (i.e. there is a high rise in the vapor pressure curve in the p,T diagram). For example, the vapor pressure thus changes at least by a factor of 50 (e.g. a glycol-water mixture of 0.02 bar at 25° C. to 1 bar at 110° C.), preferably at least by a factor of 100, wherein the freezing of the substance (e.g. at temperatures of below −40° C.) is not taken into consideration. With such a phase transformation of the substance, the pressure changes in a constant (partial) volume because of an increase in temperature. As the temperature rises, the mixture increasingly begins to boil and the vapor pressure will rise sharply. Use is particularly preferably made of a propane-butane mixture which boils in the release temperature window and reaches a vapor pressure of greater than 20 bar. Use can furthermore be made of liquids or else gases, the vapor pressure curves of which have a small change in vapor pressure and are preferably present in liquid form in the operating temperature range of the motor vehicle (−40° C. to 85° C.) and undergo a sharp increase in vapor pressure in the release temperature range, for example ammonia, 2,3-dimethyl-1, 3-butadiene or dimethylether. Said rise in pressure within the release line can expediently serve directly or indirectly as a release signal for the pressure relief unit. The rise in pressure is preferably very much greater than 20 bar, in particular in order to be able to keep the tolerance of the release device in a range which is simple to produce. A phase transformation is generally the conversion of one or more phases of a substance into other phases. The stability ranges of the phases depending on the state variables, such as pressure, temperature, chemical composition and magnetic field strength, are known and are depicted as a rule in phase diagrams or vapor pressure curves. Phase transformations can occur, inter alia, between solid, liquid and gaseous phases. The release temperature window is preferably defined by one of the following temperature ranges: approx. 95° C. to approx. 300° C., furthermore preferably approx. 95° C. to approx. 115° C. and particularly preferably approx. 105° C. to approx. 115° C. If a thermal event now takes place adjacent to the release line, the substance S within the release line is heated. If the substance temperature rises to a value within the release temperature window, for example to approx. 110° C. in the case of propane, ammonia, butane or a mixture with propane, the at least partial phase transformation results in a rise in pressure in the release line, which, in turn, actuates the pressure relief unit.

In other words, in a heat-conducting (release) line/casing/body filled with liquid (propane or butane, inter alia) or solids, the thermal input can thus induce a phase transition which leads to an increase in pressure. It is expedient in this case that the release line containing the medium can increase or reduce the effect by means of its temperature expansion. Use is therefore preferably made of a release line which has as low a thermal expansion as possible or a negative coefficient of thermal expansion. In particular, the coefficient of thermal expansion of the release line in the release temperature window is smaller than the coefficient of the thermal expansion of the substance S at least by a factor of 5, preferably by a factor of 10.

Bursting Device

The safety valve disclosed here can have a bursting device. The bursting device is designed to bring about pressure relief in the fluid system by opening the fluid system if the pressure in the fluid system exceeds the release pressure. The bursting device is fluidically connected to the release line shown here and to the valve disclosed here of the pressure relief unit. The bursting device can be provided in the housing separately from the housing of the pressure relief unit. Furthermore, the bursting device can be formed in the release line separately from the release line. For example, it can be inserted in a releasable and fluid-tight manner in one of said components. The bursting device is preferably a bursting disk. Sometimes, the release line itself or the housing itself therefore does not act as the bursting device. This affords the advantage that a separate bursting device can be released more precisely and more reliably. Furthermore, a more stable and therefore more failure-proof release line or a more stable housing can be used. Also, a destroyed bursting disk can be more easily and cost-effectively exchanged than the complete components which are as a rule larger and more complicated. The bursting device is expediently arranged and designed in such a manner that, after a bursting event, the substance S can escape into the surroundings, and therefore a pressure relief occurs in the release line and in the pressure relief unit, the pressure relief being able to release the safety valve. The bursting device is particularly preferably provided at the free end of the release line or in the housing of the pressure relief unit. It can be particularly readily integrated here. Furthermore, this then results in a simpler design of the release line. Bursting disks as such are known. A bursting device disclosed here advantageously has a (bursting device) release pressure at which the bursting device bursts.

Fluid System

The release line, the bursting device and the valve form the joint and closed fluid system or conduction system or channel system (the term fluid system is used below for simplicity). The fluid system is not limited here to a system of pipes, but rather can comprise as it were channels, flow paths, etc. In the mounted state, the fluid system is at least partially filled with the substance. The fluid system is expediently at least partially formed in the housing of the pressure relief unit. If, furthermore, the substance in the fluid system is not at a temperature above the release temperature disclosed here in any section of the fluid system, after installation an operating pressure range arises in the fluid system, in which the bursting disk does not burst nor is the valve transferred into the open state. If the bursting device has not triggered, the fluid system is a closed and in particular fluid-tight fluid system which expediently has a substantially invariable volume. In this connection, the term "substantially invariable" means that no changes in volume or negligibly small changes in volume occur, for example due to temperature expansion and/or by changing the internal pressure.

Pressures

The fluid system preferably has an operating pressure range at which the fluid system reliably prevents fuel from flowing through the pressure relief unit (i.e. the valve is in the closed position). The operating pressure range is the pressure range of the pressure in the fluid system that arises in the operating temperature range of the release line or pressure vessel. For example, the pressure vessel can be configured for an operating temperature window of −40° C. to +85° C.

The bursting device release pressure preferably lies above the max. operating pressure of the release line, preferably at least 10% or at least 20% higher. Furthermore preferably, the actuating pressure of the valve lies below the minimum normal operating pressure of the release line, preferably at least 10% or at least 20% lower.

Cartridge

The at least one release line can be designed as a cartridge which can be connected to a section of the fluid system in order to form the joint fluid system. Alternatively or additionally, an additional vessel which can be connected to a section of the fluid system can be designed as a cartridge. The cartridge is a vessel or a store which, in the non-mounted or non-connected state, is closed fluid-tightly in relation to the surroundings and is or has been opened during or after the installation. A section of the fluid system here can be a section provided in or adjacent to the pressure relief unit.

The substance disclosed here is expediently stored in the cartridge. The substance is distributed in the fluid system immediately after the connection to the fluid system. The substance in the cartridge can be pressurized prior to the connection to the fluid system in such a manner that, after the connection of the pressure container, an operating pressure is set in the fluid system i) which is greater than the actuating limit pressure of the valve, ii) and which is lower than the release pressure of the bursting disk. A pressure within the operating temperature window therefore expediently arises. The at least one cartridge and the housing can be configured to be coupled to the housing of the pressure relief unit. The at least one cartridge can be designed as a pierceable cartridge. Such a cartridge as a rule does not have a valve. Instead, a spike, for example the section disclosed here of the fluid system, pierces the cartridge as soon as the cartridge is connected or coupled. Alternatively, the cartridge can be designed as a screw cartridge or bayonet cartridge.

In particular, the cartridge can be a disposable article.

A check valve can be provided downstream of the cartridge, in particular downstream of the additional vessel. Check valves as such are known. The check valve is provided in such a manner that flow out of the cartridge is permitted and flow back into the cartridge is prevented.

With the technology disclosed here, the fuel in the event of a local thermal event preferably taking place adjacent to the release line (below: "thermal event"), in particular local heating of the pressure vessel in the central region of the pressure vessel to a temperature above a local limit temperature, can be reliably discharged.

The limit temperature can be selected, for example, in such a manner that damage to the pressure tank can be reliably excluded. For example, the limit temperature can lie below 300° C., preferably below 150° C. and particularly preferably below 120° C. However, the limit temperature preferably lies above at least 85° C. and above the operating temperature window. The release pressure of the bursting disk can be selected in such a manner that the release pressure corresponds to the pressure in the fluid system at the limit temperature.

Pressure Vessel

The technology disclosed here furthermore relates to a pressure vessel system for a motor vehicle (for example passenger motor vehicle, motorcycles, utility vehicles), comprising the at least one pressure vessel and the at least one safety valve disclosed here.

The pressure vessel serves for storing fuel which is gaseous under ambient conditions. The pressure vessel can be used, for example, in a motor vehicle which is operated using compressed natural gas (CNG) or liquefied natural gas (LNG) or using hydrogen. The pressure vessel can be in particular a cryogenic pressure vessel (CcH2 or COP) or a high-pressure gas vessel (CGH2). High-pressure gas vessels are designed to, at ambient temperatures, permanently store fuel at a nominal operating pressure (also called nominal working pressure or NWP) of approx. 350 barg (positive pressure in relation to atmospheric pressure), further preferably of approximately 700 barg or more. A cryogenic pressure vessel is suitable for storing the fuel at the above-mentioned operating pressures even at temperatures which lie considerably below the operating temperature of the motor vehicle.

The object is achieved as it were by the methods disclosed here. The technology disclosed here relates to a method for pressure relief of the pressure vessel system disclosed here, wherein a local thermal event heats the substance; wherein said heating of the substance causes the pressure in the fluid system to rise; wherein the bursting device bursts if the pressure in the fluid system exceeds the release pressure of the bursting device; wherein the substance escapes through the burst bursting device, and therefore the pressure in the fluid system is reduced to a pressure which is lower than the actuating limit pressure; wherein the valve passes from the first closed position into the second open position if the pressure in the fluid system is lower than the actuating limit pressure; and wherein the fuel escapes through the open valve and the at least one pressure vessel is thereby relieved of pressure.

The technology disclosed here relates to a method for putting the thermally activatable safety valve disclosed here into operation, with the step, according to which the fluid system is formed by connecting the at least one cartridge to a section of the fluid system. In order to form the fluid system, at least one cartridge can be connected to at least one coupling unit, wherein the cartridge stores the substance.

In other words, the technology disclosed here relates to a non-return valve and/or a gas filling unit. For this purpose, an external filling connection or a gas cartridge with a coupling can be used. Alternatively or additionally, the release line as a detection unit of a thermal event can be designed directly as a gas cartridge which is activated upon installation. A pierceable cartridge, a screw cartridge or a bayonet cartridge can advantageously be used. The release line can be a cartridge which is filled in advance with a liquid or with a gas and which can be coupled to a coupling unit of the housing (housing of the pressure relief unit) of an activation valve (valve). The cartridge can be activated in particular by installation in the coupling unit. The housing can be connectable to the on-tank valve. In one refinement, a separate cartridge is connected to the coupling unit and the release line is flooded by installation of the separate cartridge.

A simple gas filling can advantageously be realized, for example via a separate connection. A simple installation or a more rapid putting of the safety valve into operation can therefore be realized during the production of the vehicle and/or repair. The separate bursting device in the housing or in the release line permits the use of standardized components which can easily be mounted and are reliable and/or inexpensive.

The technology disclosed here will now be explained with reference to the figures.

BRIEF DESCRIPTION OF THE DRAWINGS

FIG. 4 is a schematic view of a pressure relief unit 110 in the first, closed position.
FIG. 5 is a schematic view of a pressure relief unit 110 in the second, open position.

BRIEF DESCRIPTION OF THE DRAWINGS

Figure 1:
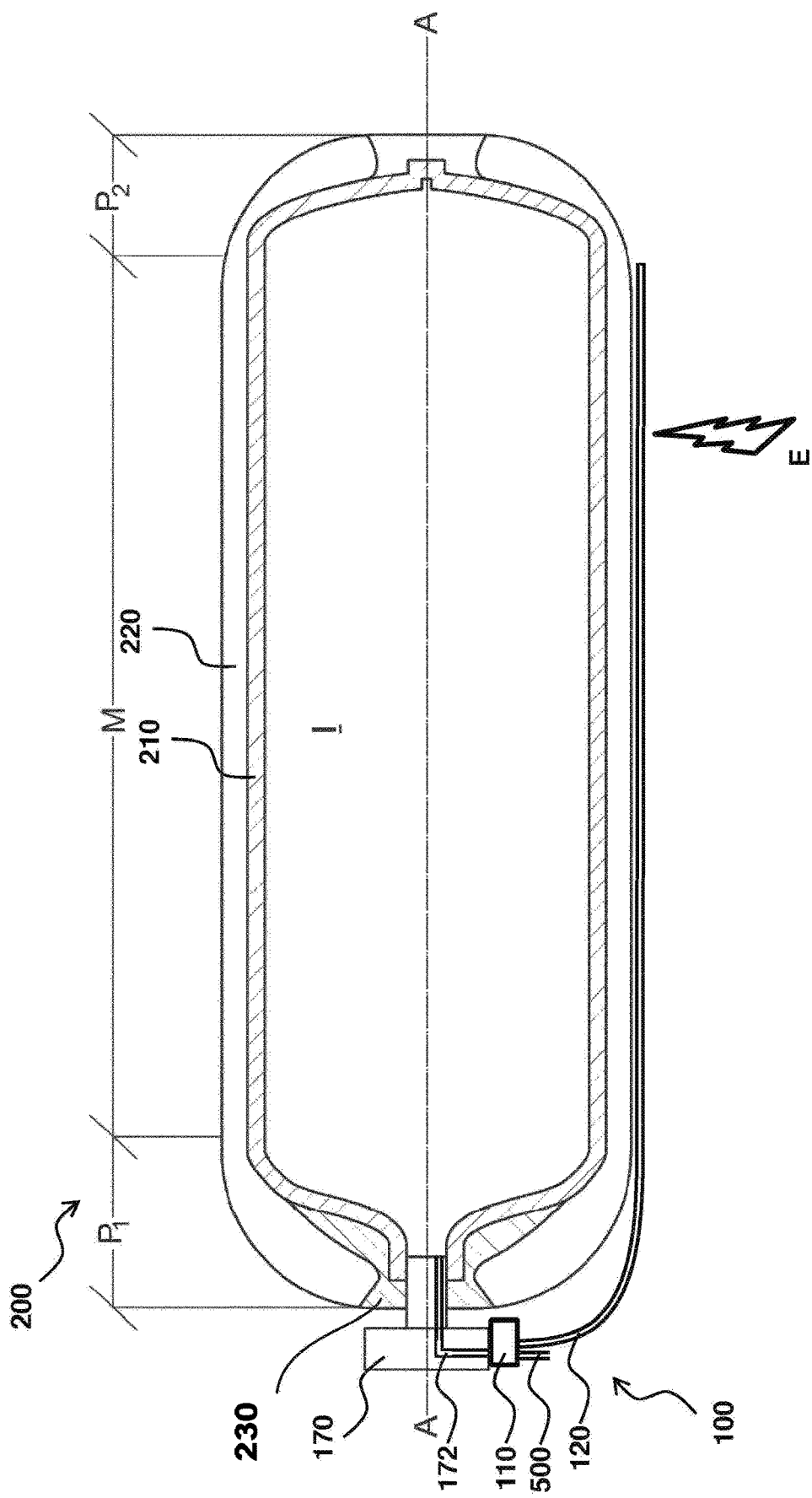
FIG. 1 is a schematic cross-sectional view of the pressure vessel system disclosed here.

FIG. 1 shows a schematic cross-sectional view of the pressure vessel system disclosed here. The pressure vessel system comprises a pressure vessel 200 and a thermally activatable safety valve 100. The pressure vessel comprises here a liner 210 which is surrounded by a fiber-reinforced layer 220. Fuel, for example hydrogen, can be stored in the interior I of the pressure vessel 200. At one end of the pressure vessel 200, a connection piece 170 is provided coaxially with respect to the longitudinal axis A-A of the pressure vessel. The connection piece 170 here is an on-tank valve which is inserted into a boss 230 of the pressure vessel 200. The pressure vessel 200 and the connection piece 170 can also be configured differently. The pressure relief unit 110 is fastened here to the connection piece 170, for example by means of screw connections (not shown). The flow path 172 produces a fluid connection between the interior I of the pressure vessel 200 and the pressure relief unit 110. Said flow path 172 is provided parallel to a filling or extraction path in the connection piece 170. The valve 115 (not shown, cf. FIGS. 2-5) is provided in the pressure relief unit 110. During the pressure relief, the fuel can flow out here through the flow path 172 and through the surroundings line 500 into the vehicle surroundings. The release line 120 begins here with one end on the housing of the pressure relief unit 110. Alternatively, it can be provided that the release line 120 begins in the pressure relief unit 110 or adjacent to the pressure relief unit 110. The release line 120 extends away here from the housing of the pressure relief unit 110. The release line 120 extends here over the end or pole region $P_1$ and projects into the central region M. The central region M is of cylindrical design here. The release line 120 can likewise helically surround the outer surface of the fiber-reinforced layer 220. Furthermore, it can be provided that the release line 120 projects into the pole region $P_2$ on the opposite end of the pressure vessel 200.

The release line 120 is produced here from a metal material. The release line 120 is configured to be stable such that it can withstand all of the pressures occurring during the operation and during the pressure relief. For example, the release line 120 can be designed to withstand pressures which may be higher at least by a factor of 1.5 or by a factor of 2 than the maximum operating pressure.

Figure 2:
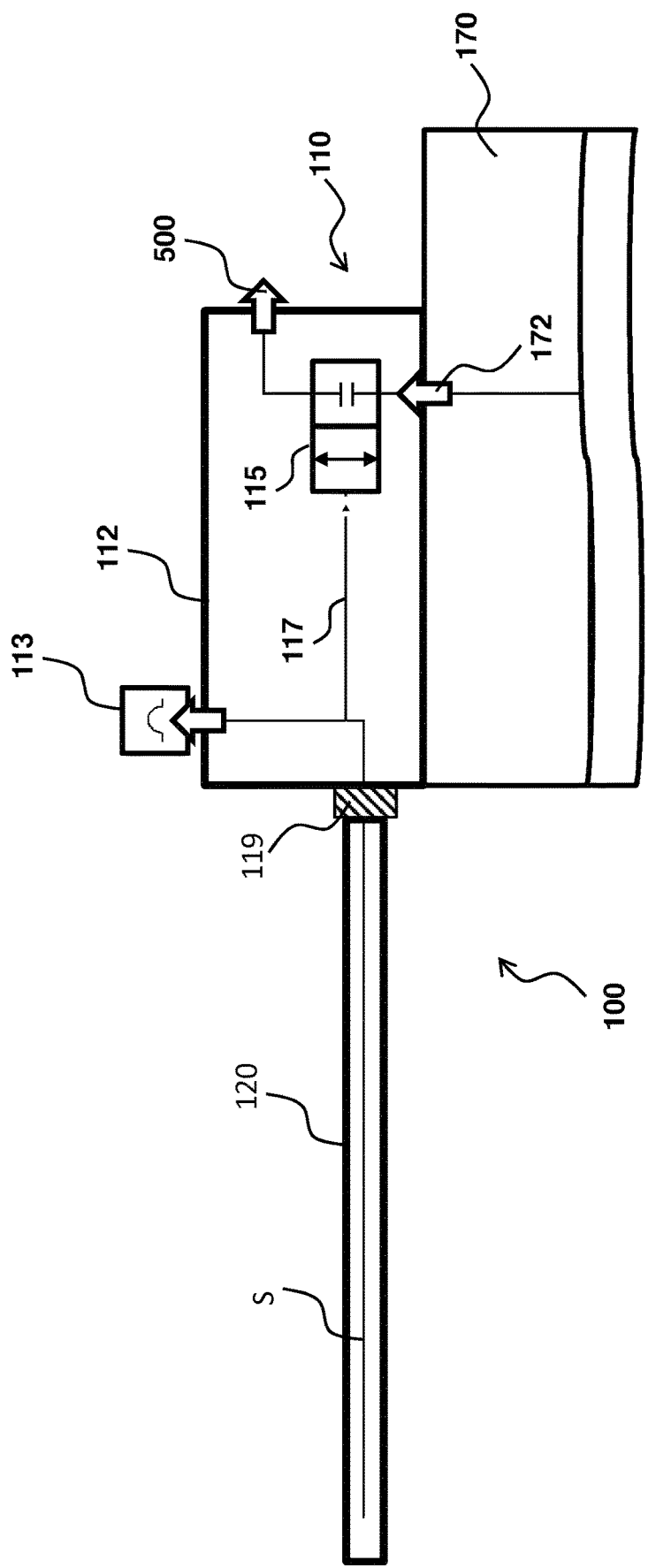
FIG. 2 is a schematic view of a safety valve 100.

FIG. 2 schematically shows a cross-sectional view of the safety valve 100 of FIG. 1. All of the components are illustrated here in simplified form. The flow path 172 here connects the valve 115 to the interior I of the pressure vessel 200. The valve 115 is designed to interrupt the fluid connection between the interior of the pressure vessel 200 and the vehicle surroundings. The valve 115 is shown here in the first closed position. The fuel can therefore not escape via the surroundings line 500 into the surroundings. The valve 115 is a pressure-actuated valve. For the pressure actuation, the valve 115 is fluidically connected to the bursting disk 113 and the release line 120. The valve 115, the bursting disk 113 and the release line 120 form the fluid system 117 here. The fluid system 117 is a closed system. Within the pressure relief unit 110, the fluid system 117 here comprises channels which are formed here by bores. The volume of the fluid system 117 has only slight changes in volume if any at all. Such changes in volume are expediently smaller than 5% or 2% or 1% of the total volume of the fluid system 117. The fluid system 117 can be formed by a release line 120 which is designed as a cartridge being connected via a coupling unit 119 to the housing 112 of the pressure relief unit 110. In a preferred refinement, the cartridge 120 is configured in such a manner that connection of the cartridge 120 to a section of the fluid system 117 that is provided here within the coupling unit 119 causes the cartridge 120 to open and the substance S which is stored in the cartridge 120 to flow out into the fluid system 117. By this means, a pressure preferably arises in the complete fluid system 117, the pressure corresponding to the (design) operating pressure of the safety valve 100 at the current temperature.

Figure 3:
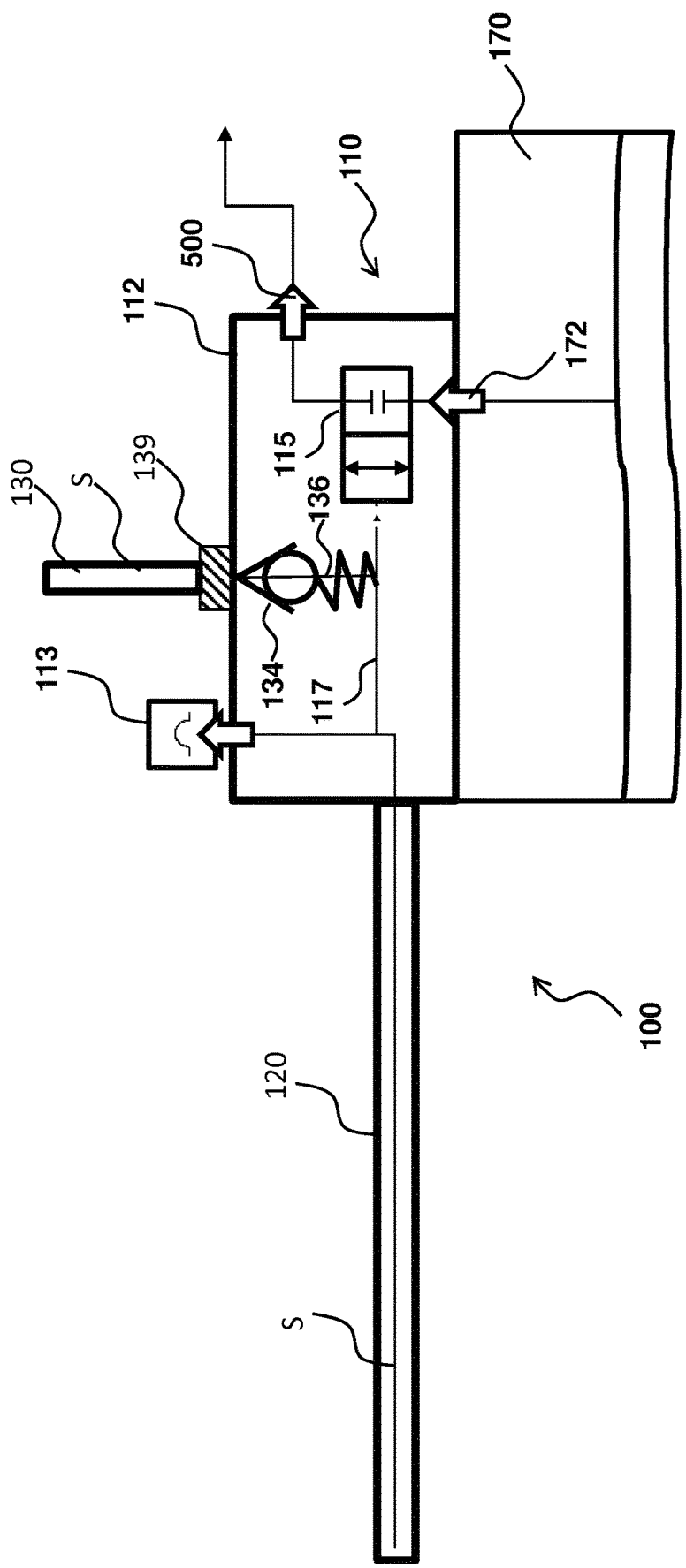
FIG. 3 is a schematic view of a further safety valve 100.

In the description below of the alternative exemplary embodiment illustrated in FIG. 3, the same reference signs are used for features which, in comparison to the first exemplary embodiment illustrated in FIG. 2 are identical and/or at least comparable in their configuration and/or operation. If said features are not explained in detail once again, the configuration and/or operation thereof corresponds to the configuration and/or operation of the features already described above. In the configuration shown here, the release line 120 is not designed as a cartridge. On the contrary, a separate connection vessel 130 is designed here as a cartridge 130. The substance S has likewise been stored here in the cartridge 130. After the cartridge 130 is connected to a section of the fluid system 117, the substance S flows via the non-return valve 134 into the fluid system 117. The connecting line 136 between the cartridge 130 and the remaining components of the fluid system 117 forms the fluid system 117 here downstream of the non-return valve 134. After flowing out of the cartridge 130, the substance S is also distributed here uniformly in the fluid system 117. The coupling unit 139 for coupling the cartridge 130 can also be configured like the coupling unit 119 of FIG. 1. After the filling, the cartridge 130 can be removed or can also remain connected. Instead of the cartridge 130, the fluid system 117 and the coupling unit 139 can also be filled via an external container or an external filling device.

FIGS. 4 and 5 show by way of example the functioning principle of the safety valve 100. FIG. 4 shows the safety valve 100 or the valve 115 in the first, closed position. In said position, the fuel which flows here through the flow path 172 into the pressure relief unit 110 cannot flow out into the surroundings through the indicated surroundings line 500. The flow path is prevented here by the piston 114. The piston 114 is provided so as to be displaceable in the flow path 172 in a direction perpendicular to the flow direction. The piston 114 is located here in the first position. Said position results from an equilibrium of forces between the spring force of the piston spring 116 and the compressive force exerted by the substance S on the piston 114 at that end of the piston 114 which is opposite the piston spring 116. The substance S is stored in the fluid system 117 at a pressure which is higher than the ambient pressure. If a thermal event E now occurs (cf. FIG. 1) in a section of the release line 120, the pressure in the fluid system 117 rises comparatively rapidly and comparatively strongly. This can be assisted in particular by the fact that the substance S undergoes a phase change with corresponding volume expansion and corresponding rise in pressure within the release temperature window. If, for example, in one configuration, the temperature rises locally to a value of greater than 85° C., this can bring about a sharp rise in pressure in the fluid system 117. The bursting disk particularly preferably can have a release pressure which is selected in such a manner that the release pressure is reached within the fluid system 117 by the local rise in temperature to a value within the temperature release field. If the release pressure arises within the fluid system 117 because of the rise in temperature, the bursting disk 113 bursts. As shown in FIG. 5, the substance S can then escape through the opening in the bursting disk 113. As a result, the pressure in the fluid system 117 is reduced to a pressure which is lower than the actuating limit pressure of the valve 115. The actuating limit pressure here is the pressure which has at least to be applied in order to hold the piston 114 in the first, closed position. If the pressure in the fluid system 117 is now lower than the actuating limit pressure, the piston spring 116 transfers the piston 114 from the first, closed position into the second, open position (cf. FIG. 5). In the second, open position, the fuel can escape through the flow path 172 or through the surroundings line 500. Pressure relief of the pressure vessel system therefore occurs. Such a system is advantageous in that a malfunction of the safety valve 100 would lead to pressure relief of the pressure vessel system. The risk of hidden faults can therefore be reduced.

For the sake of legibility, the expression "at least one" has in part been omitted for the sake of simplicity. If a feature of the technology disclosed here is described in the singular or indeterminate (for example, the/a pressure vessel, the/a safety valve, the/a pressure relief unit, the/a valve, the/a release line, the/a bursting device, the/a fluid system, the/a cartridge, the/an additional vessel, the/a check valve, the/a housing, etc.), the disclosure is simultaneously also intended to encompass the plural thereof (for example, the at least one pressure vessel, the at least one safety valve, the at least one pressure relief unit, the at least one valve, the at least one release line, the at least one bursting device, the at least one fluid system, the at least one cartridge, the at least one additional vessel, the at least one check valve, the at least one housing, etc.).

The above description of the present invention serves merely for illustrative purposes and not for the purposes of limiting the invention. In the context of the invention, numerous changes and modifications are possible without departing from the scope of the invention and its equivalents.

What is claimed is:

1. A thermally activatable safety valve for a pressure vessel, comprising:
a pressure relief unit with a valve for pressure relief of the pressure vessel;
at least one release line which extends away from the pressure relief unit; and
at least one bursting device, wherein
the release line, the bursting device and the valve are fluidically connected and form a common fluid system,
the valve is designed to pass from a first closed position into a second open position, for pressure relief of the pressure vessel, if pressure in the common fluid system is lower than an actuating limit pressure, and
the bursting device is designed to bring about pressure relief in the common fluid system if the pressure in the common fluid system exceeds a release pressure, by bursting in direct response to the pressure in the common fluid system,
wherein the bursting device is a bursting disk.

2. The safety valve according to claim 1, wherein the at least one release line is designed as a cartridge which is connectable to a section of the common fluid system in order to form the common fluid system.

3. The safety valve according to claim 2, wherein the cartridge stores a substance which is distributed in the common fluid system immediately after the connection.

4. The safety valve according to claim 3, wherein the substance in the cartridge is pressurized prior to the connection in such a manner that, after the connection, an operating pressure is set in the common fluid system which (i) is greater than the actuating limit pressure, and (ii) is lower than the release pressure.

5. The safety valve according to claim 2, wherein the cartridge is designed to be coupled to a housing of the pressure relief unit.

6. The safety valve according to claim 1, wherein at least one additional vessel which is connectable to a section of the common fluid system is designed as a cartridge.

7. The safety valve according to claim 6, wherein at least one of said cartridges stores a substance which is distributed in the common fluid system immediately after the connection.

8. The safety valve according to claim 7, wherein the substance in the at least one cartridge is pressurized prior to the connection in such a manner that, after the connection, an operating pressure is set in the common fluid system which (i) is greater than the actuating limit pressure, and (ii) is lower than the release pressure.

9. The safety valve according to claim 7, wherein the at least one cartridge is designed to be coupled to a housing of the pressure relief unit.

10. The safety valve according to claim 7, wherein a check valve is provided downstream of the at least one cartridge.

11. The safety valve according to claim 1, wherein
at least one additional vessel which is connectable to a section of the common fluid system is designed as a cartridge.

12. The safety valve according to claim 11, wherein
a check valve is provided downstream of the at least one cartridge.

13. The safety valve according to claim 1, wherein
the bursting device is provided in a housing of the pressure relief unit.

14. A pressure vessel system, comprising:
at least one pressure vessel; and
at least one thermally activatable safety valve according to claim 1.

15. A method for pressure relief of a pressure vessel system comprising a pressure vessel and a thermally activatable safety valve for the pressure vessel, the safety valve having:
a pressure relief unit with a valve for pressure relief of the pressure vessel;
at least one release line which extends away from the pressure relief unit and is designed as a cartridge that stores a substance; and
at least one bursting device, wherein
the release line, the bursting device and the valve are fluidically connected and form a common fluid system,
the valve is designed to pass from a first closed position into a second open position, for pressure relief of the pressure vessel, if the pressure in the common fluid system is lower than an actuating limit pressure, and
the bursting device is designed to bring about pressure relief in the common fluid system if the pressure in the common fluid system exceeds a release pressure, by bursting in direct response to the pressure in the common fluid system,
the method comprising:
heating the substance due to a local thermal event;
causing the pressure in the common fluid system to rise due to the heating of the substance;
bursting the bursting device if the pressure in the common fluid system exceeds the release pressure of the bursting device, wherein the substance escapes through the burst bursting device, and therefore the pressure in the common fluid system is reduced to a pressure which is lower than the actuating limit pressure;
passing the valve from the first closed position into the second open position if the pressure in the common fluid system is lower than the actuating limit pressure, wherein fuel escapes through the valve in the open position,
wherein the bursting device is a bursting disk.

16. A method for putting a thermally activatable safety valve into operation, the safety valve having:
a pressure relief unit with a valve for pressure relief of a pressure vessel;
at least one release line which extends away from the pressure relief unit; and
at least one bursting device,
the method comprising the step of:
forming a common fluid system comprising the release line, the bursting device and the valve by connecting the release line, in the form of at least one cartridge, to a section of the common fluid system,
wherein the valve is designed to pass from a first closed position into a second open position, for pressure relief of the pressure vessel, if pressure in the common fluid system is lower than an actuating limit pressure,
wherein the at least one bursting device is designed to bring about pressure relief in the common fluid system by bursting in direct response to the pressure in the common fluid system, and
wherein the bursting device is a bursting disk.

17. The method according to claim 16, wherein
in order to form the common fluid system, at least one cartridge is connected to at least one coupling unit, wherein the cartridge stores a substance distributed in the common fluid system.

* * * * *